Dec. 31, 1935.  J. GROLÉE  2,026,466

ELECTROLYTIC SYSTEM FOR THE PRODUCTION OF ALUMINUM

Filed Aug. 11, 1932

Inventor.
JEAN GROLEE
by his attorneys

Patented Dec. 31, 1935

2,026,466

UNITED STATES PATENT OFFICE 2,026,466

ELECTROLYTIC SYSTEM FOR THE PRODUCTION OF ALUMINUM

Jean Grolée, Tarascon Sur Ariere, France, assignor to Compagnie de Produits Chimiques et Electrometallurgiques Alais, Froges et Camargue, Paris, France, a corporation of France Application August 11, 1932, Serial No. 628,438
In France August 12, 1931

6 Claims. (Cl. 204—20)

The present invention relates to electrolytic plants having variable internal characteristics, and particularly to installations for the manufacture of aluminum. The chief object of my invention is to provide an electrolytic plant of that type in which the power or load that is consumed is regulated in such manner as to be maintained substantially constant.

According to the present invention I obtain this result by making use of a load regulator having watt-meter windings, that is to say tension or voltage coils and intensity or current coils. The regulator is so arranged that the load or power consumed, corresponding to the product of the tension and intensity, is kept at a substantially constant value, this result being obtained preferably by raising and lowering the tension applied to the electrolytic cells in such manner as to suit the variations of their internal characteristics.

The regulator that is used according to my invention may be of the slow or of the quick action type. It may act either on the exciting rheostat of the generators that feed the electrolytic circuits, or on the induction regulators and variable current intake transformers connected to the rotary converters and rectifiers.

The measuring circuit of the regulator may either be connected to the terminals of the wattmetric elements coupled with the driving motor or to the induction regulators and the transformers or it may utilize the difference of potential at the terminals of the shunts connected to the electrolytic circuits.

In order to reduce the volt-rises that might be produced at the terminals of the direct current generators, the regulators are provided with limiting devices the measuring circuits of which are fed by the tension of the electrolytic circuits.

In order to reduce the intensity-rises, the same regulators are provided with limiting devices fed by the difference of potential at the terminals of the shunts that carry the current in the electrolytic circuits.

These limiting devices come into operation to replace the power regulators and to take over the control of the intensity and the tension when the limit conditions of regulation are attained.

The mode of regulation according to my invention has, in particular, the two following chief advantages:

1. When an electrolytic aluminum manufacturing plant is fed with electric current by a high tension distribution system and a transformer station comprising converter groups, rotary converters, or mercury vapour rectifiers, it becomes possible to feed the series of cells or baths with a constant power, and thus to eliminate the present inferiority of rotary converters and, synchronous or rectifier sets as compared with hydraulically driven dynamos for feeding electric current to such plants.

In hydro-electric plants, the output of the turbines is substantially constant, and to any drop of the intensity there corresponds a rise of the tension such that the product V x I (V being the tension and I the intensity) remains substantially constant and proportional to the opening of the gate of the turbine.

On the contrary, with electrical plants (either of the synchronous or of the asynchronous type) working with a constant speed of revolution, or with rotary converters and rectifiers, the variations of intensity act on the tension only in proportion with the variations of the drop of tension in the generators, that is to say in an insignificant manner, and the variations of the product V x I depend on I, and accordingly on the variations of the internal characteristics of the receiving plant.

Under these conditions, it will readily be understood that the capacity of production of a series of electrolytic cells is considerably increased when it is regulated by means of the device according to my invention, which makes it possible to increase the number of ampere-hours that said series of electrolytic cells can take up in a given time.

2. When a given power is available or contracted for from a distribution system supplying current to series of electrolytic cells for the manufacturing of aluminium through synchronous sets, rotary converters or rectifiers, it is not possible to utilize at every instant the maximum power available, due to the drops of power that occur in the direct current sets for each variation of the internal characteristics of the electrolytic cells.

It results from the foregoing explanations that the device according to my invention makes it possible to obviate these drawbacks and to obtain the maximum coefficient of utilization from the energy producing, conveying, and transforming plants.

By way of example, when 70 cells for the production of aluminium are worked with a constant tension, there take place continual variations of counter-electromotive force inherent in the phenomenon of electrolysis itself. It may be safely assumed on an average that the variations of intensity, and therefore of power, are about as high as 28%. The same battery of electrolytic cells, when fitted with regulators according to my invention, will take a rigorously constant power in which the reduction of intensity will be only 9%. The coefficient of utilization will therefore have been increased by 28% on the power, and the output of the plant, which depends on the number of ampere-hours, is increased by 19%.

Preferred embodiments of my invention will be hereinafter described with reference to the accompanying drawing, given merely by way of example, and in which.

Figure 1:
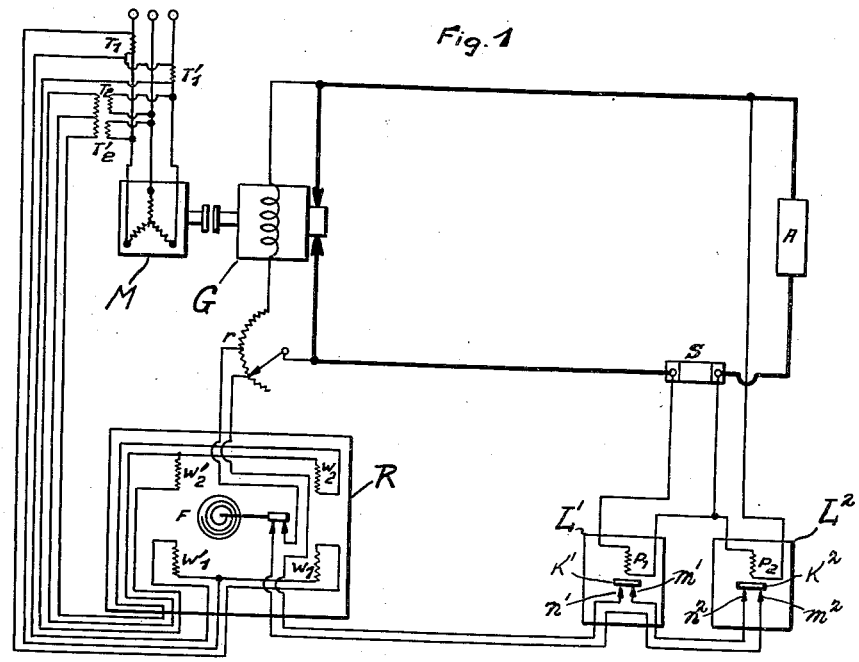
Fig. 1 is a diagrammatical view showing an electrolytic plant fed through a shunt wound generator and provided with a quick acting power regulator according to my invention.

In the electrolytic plant shown in Fig. 1, the high tension distribution system feeds a synchronous motor M driving a shunt wound generator G. Said generator supplies electric current to the electrolytic circuit comprising a series of electrolytic cells A for the production of aluminum. The power regulator R that controls the field rheostat $r$ of the generator is of any known type and its series and shunt windings are fed through transformers $T^1$ $T'_1$ and $T^2$ $T'_2$ respectively. The regulator may for instance consist of windings $W_1$, $W'_1$, $W_2$, $W'_2$ disposed about a movable armature F sensitive to variations of tension and intensity in said windings respectively. Said armature is subjected to the action of spring $s$ and carries an arm H adapted to connect two contacts I and J. Thus when the armature is caused by the electromagnetic field acting thereon to rotate in an anti-clockwise direction, contacts I and J are connected through said arm H and a portion of resistance $r$ is short-circuited. That arrangement comprises a single armature, but the regulator might also be applied to machines having multiple armatures, the control of the exciting rheostats being effected simultaneously, and a balancing device making it possible to distribute the loads upon the armatures.

Regulator R is provided with limiting devices $L^1$ and $L^2$ which consists for instance of movable contacts $K^1$, $K^2$ respectively acting on contact studs $N^1$, $M^1$ and $N^2$, $M^2$ respectively; same contacts $K^1$, $K^2$ are controlled by windings $P_1$ and $P_2$ respectively. The control circuit of the intensity limiting device $L^1$ is connected to the terminals of a shunt S connected to the electrolytic circuit. The control circuit of tension limiting device $L^2$ is connected in shunt with the battery of cells for the production of the aluminum.

Figure 2:
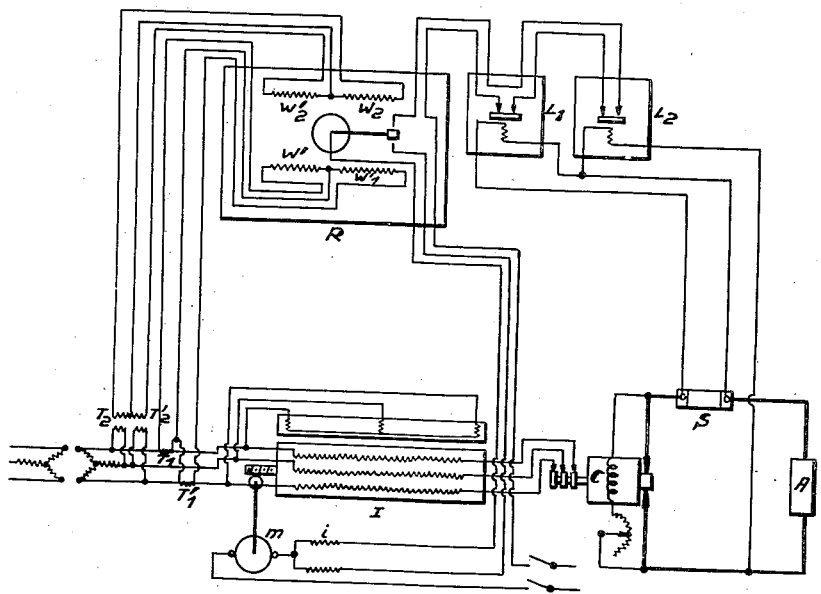
Fig. 2 is a diagrammatic view showing an electrolytic plant fed through a rotary converter and provided with a slow acting regulator according to my invention.

The arrangement shown in Fig. 2 is similar to that of Fig. 1. The distribution system feeds current to rotary converter C through transformer T and induction regulator I. Said rotary converter itself feeds with direct current the electrolytic furnaces A. The wattmetric circuit of the power regulator R is fed through transformers $T^1$ $T'_1$ and $T^2$ $T'_2$. Said regulator which is of the same type as that above described with reference to Fig. 1 acts on a reversing device $i$ connected to the feed circuit of an auxiliary motor $m$ driving the induction regulator. As in the preceding example, regulator R may be provided with intensity and tension limiting devices $L^1$ and $L^2$ respectively, the measuring circuits of which are fed as shown in the drawing.

It should be well understood that I do not wish to be limited to the specific examples which have been above described as there might be changes made in the arrangement, disposition and form of the different elements without departing from the principle of my invention as comprehended within the scope of the accompanying claims. The regulating device according to my invention can be connected to each supply set or to each group of electrolytic elements and the excitations can be supplied by generators mounted on the same shaft or independent of each other, and which can optionally be connected to the regulator through any suitable device.

What I claim is:

1. In combination with a plant including electrolysis cells having varying internal characteristics, used for the electrolytic manufacture of aluminum, current generating means for feeding current to said cells, a load regulator including cooperating watt-meter windings connected with said means and control means for the current generating means operative in response to variations set up in said windings due to variations in internal characteristics of said cells whereby the power consumed is maintained substantially constant by the regulator in spite of variations in the internal characteristics of the plant.

2. In combination with a plant including electrolysis cells having varying internal characteristics, used for the electrolytic manufacture of aluminum and an electric distribution system, generator for feeding electric current to said cells, a motor for driving said generator fed by said electric distribution system, a rheostat for controlling said generator, a load regulator, co-operating watt-meter windings in said regulator connected with the circuit of said motor, and means for causing said regulator to control said rheostat.

3. In combination with a plant including electrolysis cells having varying internal characteristics, used for the electrolytic manufacture of aluminum and an electric distribution system, a rotary converter for feeding electric current to said cells, a transformer and an induction regulator for connecting said rotary converter to said electric distribution system, an auxiliary motor for driving said induction regulator, a load regulator, co-operating watt-meter windings in said load regulator connected with the circuit of said induction regulator, and means for causing the second mentioned regulator to control said auxiliary motor.

4. In combination with a plant including electrolysis cells having varying internal characteristics, used for the electrolytic manufacture of aluminum and an electric distribution system, converting means for transforming the current of said electric distribution system into current for said circuit, a load regulator, cooperating watt-meter windings in said regulator connected with the input circuit of said converting means, and means for causing said regulator to control said converting means.

5. A combination according to claim 1 further comprising means operative by voltage rises in said cells and connected with said regulator for limiting the tension of the current flowing through said cells.

6. A combination according to claim 1 further comprising means operative by intensity rises in said cells and connected with said regulator for limiting the intensity of the current flowing through said cells.

JEAN GROLÉE.